United States Patent
Torralba et al.

(10) Patent No.: US 11,716,386 B1
(45) Date of Patent: Aug. 1, 2023

(54) DYNAMIC SENSOR NETWORK IN ATMOSPHERIC SUIT

(71) Applicant: Hamilton Sundstrand Corporation, Charlotte, NC (US)

(72) Inventors: Monica Torralba, Antioch, CA (US); Ashley Rose Himmelmann, Beloit, WI (US); Jake Rohrig, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/571,674

(22) Filed: Jan. 10, 2022

(51) Int. Cl.
| | |
|---|---|
| *H04L 67/12* | (2022.01) |
| *G06F 1/16* | (2006.01) |
| *B64G 6/00* | (2006.01) |
| *A62B 17/00* | (2006.01) |
| *B64D 1/00* | (2006.01) |
| *B64G 1/46* | (2006.01) |

(52) U.S. Cl.
CPC ............ *H04L 67/12* (2013.01); *B64G 6/00* (2013.01); *G06F 1/163* (2013.01); *A62B 17/008* (2013.01); *B64D 1/00* (2013.01); *B64G 1/46* (2013.01)

(58) Field of Classification Search
CPC .......... H04L 67/12; B64G 6/00; G06F 1/163; A62B 17/008; B64D 1/00
See application file for complete search history.

(56) References Cited

U.S. PATENT DOCUMENTS

| | | | |
|---|---|---|---|
| 8,692,886 B2 | 4/2014 | Ennis | |
| 10,491,819 B2 | 11/2019 | Corcoran | |
| 2017/0246961 A1* | 8/2017 | Lee | H04B 3/54 |
| 2020/0285464 A1* | 9/2020 | Brebner | G06F 11/362 |
| 2021/0005850 A1* | 1/2021 | Thiel | H01M 50/207 |
| 2021/0223557 A1 | 7/2021 | Lamm et al. | |
| 2021/0291198 A1* | 9/2021 | Peltz | D03D 1/0088 |
| 2021/0337913 A1* | 11/2021 | Keith | A42B 3/0453 |
| 2021/0386145 A1* | 12/2021 | Dong | G06F 3/016 |

OTHER PUBLICATIONS

Mohammed Taj-Eldin (Wireless Body Area Networks for Intra-Spacesuit Communications: Modeling, Measurements and Wearable Antennas, Mohammed Taj-Eldin, Kansas State University, An Abstract of a Dissertation, 2015; hereinafter Taj) (Year: 2015).*

* cited by examiner

*Primary Examiner* — Michael A Keller
(74) *Attorney, Agent, or Firm* — Cantor Colburn LLP

(57) ABSTRACT

A system in an atmospheric suit includes a controller within the atmospheric suit. The system also includes a network that is a hub and spoke network arranged within the atmospheric suit. The controller is the hub of the network and each spoke of the network represents wiring that leads to one of a plurality of ports accessible from outside the atmospheric suit.

20 Claims, 3 Drawing Sheets

DYNAMIC SENSOR NETWORK IN ATMOSPHERIC SUIT

BACKGROUND

Exemplary embodiments pertain to the art of atmospheric suit and, in particular, to a dynamic sensor network in an atmospheric suit.

In some environments and applications, an atmospheric suit is used not only for protection against impacts but also to maintain a habitable environment. In a space application, for example, an extravehicular mobility unit (EMU), which includes a helmet and full body suit supplied by an oxygen tank, maintains an environment that sustains the astronaut.

BRIEF DESCRIPTION

In one exemplary embodiment, a system in an atmospheric suit includes a controller within the atmospheric suit. The system also includes a hub and spoke network arranged within the atmospheric suit. The controller is the hub of the network and each spoke of the network represents wiring that leads to one of a plurality of ports accessible from outside the atmospheric suit.

In addition to one or more of the features described herein, the controller obtains data from one or more sensors coupled to one or more of the plurality of ports.

In addition to one or more of the features described herein, the one or more sensors includes a camera, a proximity sensor, a range finder, or a Geiger counter and the controller processes the data from the one or more sensors to obtain information.

In addition to one or more of the features described herein, a wearer of the atmospheric suit specifies processing of the data.

In addition to one or more of the features described herein, the controller provides information based on the data to a wearer of the atmospheric suit as output to one or more output devices.

In addition to one or more of the features described herein, the one or more output devices include audio, video, or haptic output devices.

In addition to one or more of the features described herein, one of the one or more sensors is a camera, one of the one or more output devices is a display device, and the controller obtains images from the camera and provides the information based on the images for display to the wearer on the display device.

In addition to one or more of the features described herein, the system also includes microcontrollers corresponding with one or more of the plurality of ports.

In addition to one or more of the features described herein, the network includes redundant communication between two or more of the plurality of microcontroller or between two or more of the ports.

In addition to one or more of the features described herein, the system also includes a cover on each of the plurality of ports.

In another exemplary embodiment, a method of assembling a system in an atmospheric suit includes configuring a controller within the atmospheric suit. The method also includes arranging a network as a hub and spoke network within the atmospheric suit. The controller is the hub of the network and each spoke of the network represents wiring that leads to one of a plurality of ports accessible from outside the atmospheric suit.

In addition to one or more of the features described herein, the configuring the controller includes the controller obtaining data from one or more sensors coupled to one or more of the plurality of ports.

In addition to one or more of the features described herein, the one or more sensors includes a camera, a proximity sensor, a range finder, or a Geiger counter and the configuring the controller includes the controller processing the data from the one or more sensors to obtain information.

In addition to one or more of the features described herein, the configuring the controller includes the controller obtaining an indication of the processing of the data from a wearer of the atmospheric suit.

In addition to one or more of the features described herein, the configuring the controller includes the controller providing information based on the data to a wearer of the atmospheric suit as output to one or more output devices.

In addition to one or more of the features described herein, the one or more output devices include audio, video, or haptic output devices.

In addition to one or more of the features described herein, one of the one or more sensors is a camera, one of the one or more output devices is a display device, and the configuring the controller includes the controller obtaining images from the camera and providing the information based on the images for display to the wearer on the display device.

In addition to one or more of the features described herein, the arranging the network includes disposing microcontrollers corresponding with one or more of the plurality of ports.

In addition to one or more of the features described herein, the arranging the network includes configuring redundant communication between two or more of the plurality of microcontroller or between two or more of the ports.

In addition to one or more of the features described herein, the method also includes disposing a cover on each of the plurality of ports.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, an atmospheric suit maintains a habitable environment for the wearer in different applications. In the exemplary space application, the atmospheric suit may be an EMU. While the atmospheric suit is essential in an otherwise uninhabitable environment, it can be bulky and restrict spatial awareness. For example, unlike a motorcycle helmet or the like, the helmet of the atmospheric suit is fixed such that a wearer moves their head without moving the helmet (i.e., the transparent portion of the helmet). Thus, looking to the side or behind requires moving the body (and, correspondingly, the atmospheric suit) to expose the side or back to the transparent portion of the helmet. In addition, depending on the nature and duration of an extravehicular mission, sensors may be needed for safety or data-gathering. These sensors may be difficult to carry and operate in the atmospheric suit.

Embodiments of the systems and methods detailed herein relate to a dynamic sensor network in an atmospheric suit. The network may be structured in a hub and spoke configuration with a controller of the atmospheric suit acting as the hub. Each spoke may lead to a port accessible outside the atmospheric suit, and different sensors may be coupled to the port, as needed. According to alternate or additional embodiments, a battery of the atmospheric suit may act as the hub with the spokes facilitating charging of the sensors.

Figure 1:
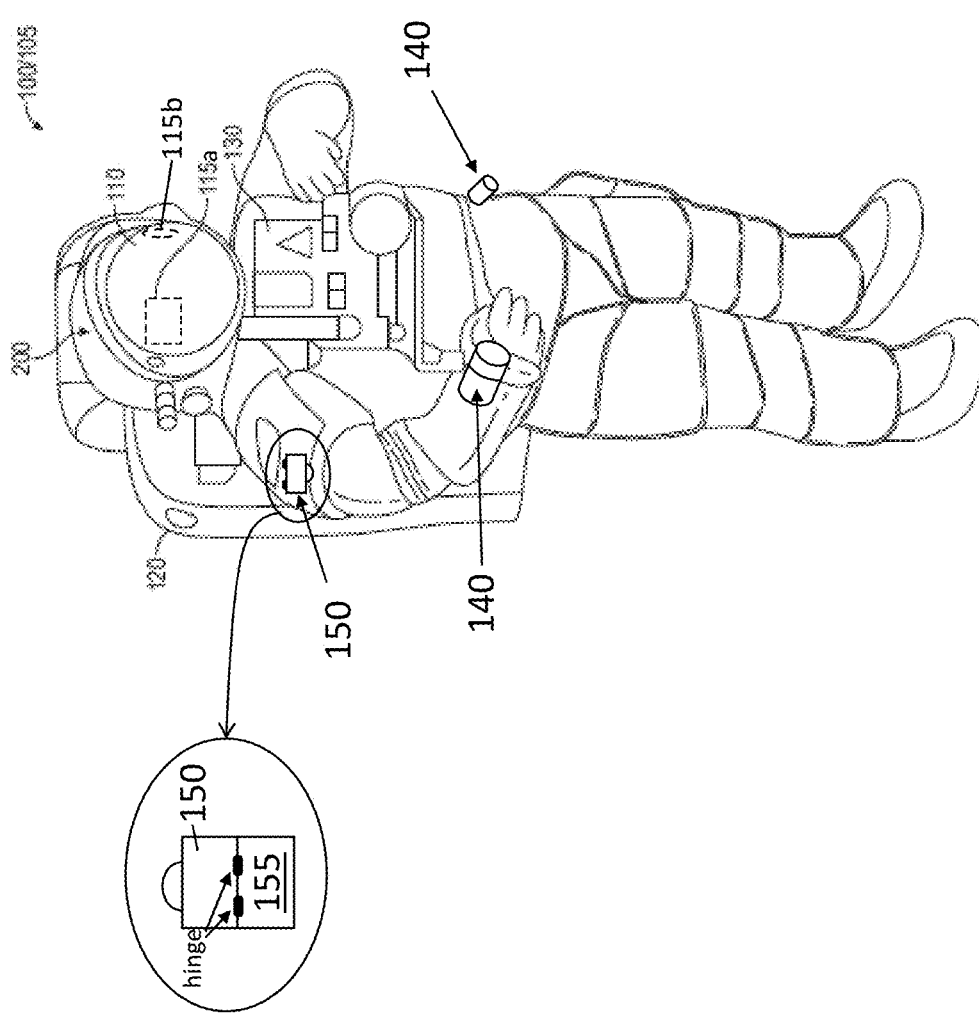
FIG. 1 shows an atmospheric suit that includes a dynamic sensor network according to one or more embodiments.

FIG. 1 shows an atmospheric suit 100 that includes a dynamic sensor network 200 (FIG. 2) according to one or more embodiments. The exemplary atmospheric suit 100 shown in FIG. 1 is an EMU 105. Systems that are affixed as part of the EMU 105 include a primary life support system (PLSS) 120 and a display and control module (DCM) 130. These systems 120, 130, along with components of the EMU 105, create a habitable environment for a wearer performing extravehicular activity in space. While an EMU and a space application are specifically discussed for explanatory purposes, applications for the controller system architecture according to one or more embodiments may also include underwater (e.g., in an atmospheric diving suit), earth-based (e.g., in a hazmat suit or contamination suit), high-altitude (e.g., in a flight suit), and sub-surface environments. Generally, any suit that includes the helmet to maintain a habitable environment is referred to as an atmospheric suit.

The EMU 105 includes a helmet 110, shown with an exemplary in-helmet display as one exemplary output device 115a and a speaker as another exemplary output device 115b (generally referred to as output device 115). The helmet 110 has a transparent inner bubble that maintains the environment in the EMU 105, as well as a transparent outer bubble that protects against impacts. The display device may include a screen on a swingarm that allows the screen to be raised to eye level for viewing or may include an organic light emitting diode (OLED) array. An OLED display device may be inside the helmet, with the inner bubble acting as a substrate, or may be in the gap between the inner and outer bubbles, with the outer bubble acting as the substrate. A display device may also be on a swingarm or otherwise affixed on the outside of the helmet 110. According to exemplary embodiments, the EMU 105 may include two or more display devices whose number and location is not intended to be limited by the discussion of exemplary embodiments.

The speaker may be inside the inner bubble or may include a diaphragm on the outside of the inner bubble that vibrates to produce an audio output. The numbers, types, and locations of speakers is not intended to be limited by the examples. Further, in addition to audio and visual output devices 115, haptic or combination output devices 115 may be provided in the EMU 105. The numbers, types, and locations of output devices 115 that provide information to the wearer of the EMU 105 are not intended to be limited by the discussion of specific examples.

One or more sensors 140 (e.g., video/still camera, infrared camera, proximity sensor, Geiger counter, rangefinder) may dynamically be affixed to the EMU 105. Dynamic refers to the fact that the numbers and positions of sensors 140 may be changed at any time, even during extravehicular activity. Two exemplary sensors 140 are indicated in FIG. 1. Also indicated is an unused port 155. While not visible, each of the sensors 140 is coupled to the dynamic sensor network 200 via a port 155. As the expanded view indicates, the port 155 may have a cover 150 when unused to prevent dust or other particles from entering the port 155. In FIG. 1, one sensor 140 (e.g., Geiger counter) is shown affixed to an arm of the EMU 105 and another sensor 140 (e.g., camera) is shown affixed at the hip. As shown, the camera may be angled down so that the path ahead of the EMU 105 may be viewed in real time on a display used as the output device 115 while walking. The dynamic sensor network 200 that facilitates obtaining data from these and other sensors 140 and providing information via one or more output devices 115 is detailed with reference to FIG. 2.

Figure 2:
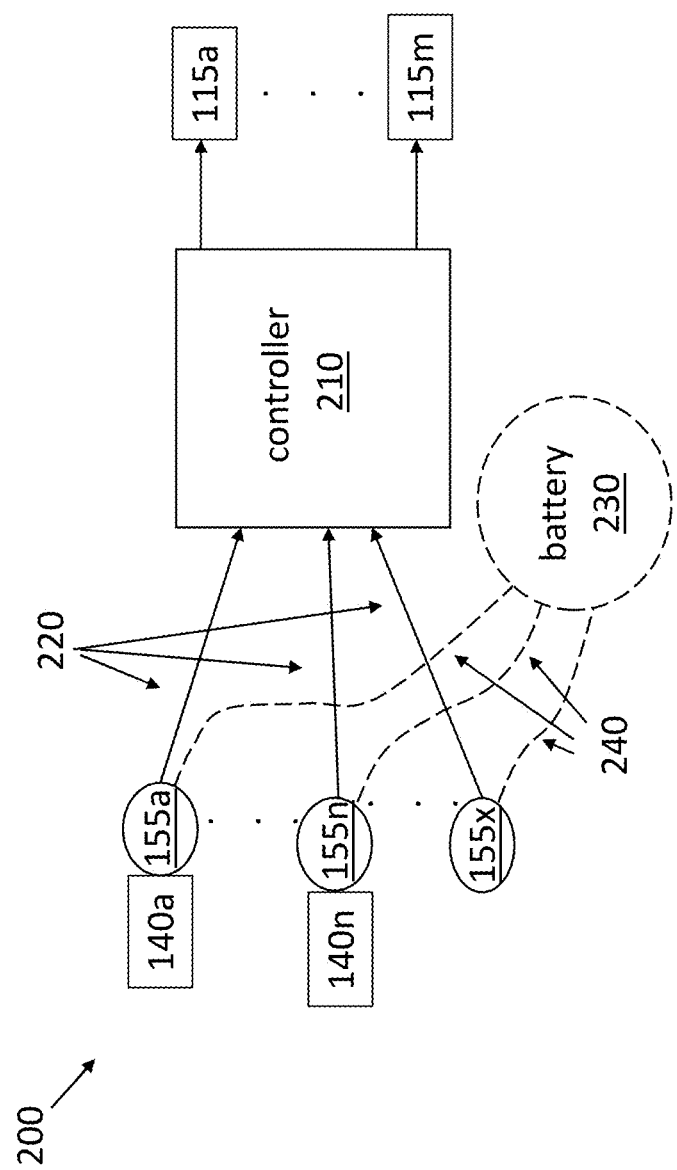
FIG. 2 is a block diagram of an exemplary dynamic sensor network according to one or more embodiments.

FIG. 2 is a block diagram of an exemplary dynamic sensor network 200 according to one or more embodiments. As previously noted, the dynamic sensor network 200 may be in a spoke and hub arrangement. According to an exemplary embodiment, a controller 210 acts as the hub. The controller 210 may be part of the DCM 130, for example, with one or more processors and memory devices that facilitate obtaining data from one or more of the sensors 140 via communication lines 220 (i.e., spokes) and providing information to one or more output devices 115. The exemplary dynamic sensor network 200 is shown with sensors 140a through 140n (e.g., camera, infrared camera, proximity sensor, Geiger counter, rangefinder) while ports 155a through 155x are shown. That is, some ports 155 may be unused during a given mission. FIG. 2 also shows output devices 115a through 115m (e.g., audio, visual, haptic).

For example, one of the sensors 140 may be a camera coupled to a port 155 near the hand of the EMU 105. This camera may be used to see around objects in a cave or the like. The images provided as data over the communication line 220 corresponding to the data port 155 may be projected to an OLED display on the inner bubble of the helmet 110 as the output device 115. As another example, a sensor 140 may be a Geiger counter coupled to one of the ports 155. The radiation readings provided to the controller 210 over the corresponding communication line 220 may be checked by the controller 210 to determine if a threshold value has been crossed. If so, the controller 210 may provide an audible alert to an output device 115 that is a speaker or provide haptic feedback to an output device 115 that implements a vibration.

The type of data provided by a given sensor 140 may determine the analysis performed by the controller 210, as well as the output provided to an output device 115. The data may be provided with an identifier or may be recognizable based on the content. The controller 210 may essentially implement a mapping of the processing that is appropriate for each data type. Input from the wearer of the EMU 105, provided via the DCM 130, for example, may affect the processing that is performed by the controller 210. The table below provides exemplary processing that may be performed based on the data obtained by the controller 210. The examples provided for explanatory purposes are not intended to limit additional sensors 140, processing by the controller 210, or additional output devices 115.

TABLE 1

Exemplary inputs and outputs of a dynamic sensor network 200.

| data from sensor 140 | processing performed by controller 210 | output to output device 115 |
|---|---|---|
| image data from camera | pass through or any specified image processing | display to one or more display devices |
| radiation level from Geiger counter | compare with a predefined threshold value | audio, video, haptic alert |
| proximity (distance) from proximity sensor | pass through or compare with a predefined threshold distance | display distance to closest object or provide alert based on a distance below the predefined threshold distance |
| range to an object from rangefinder | pass through | range display to one or more display devices |

According to an alternate or additional embodiment, a battery 230 of the EMU 105 may be a hub. The battery may be part of the PLSS 120, for example. One or more sensors 140 may be powered or charged via power lines 240 from the battery 230 to corresponding ports 155.

Figure 3:
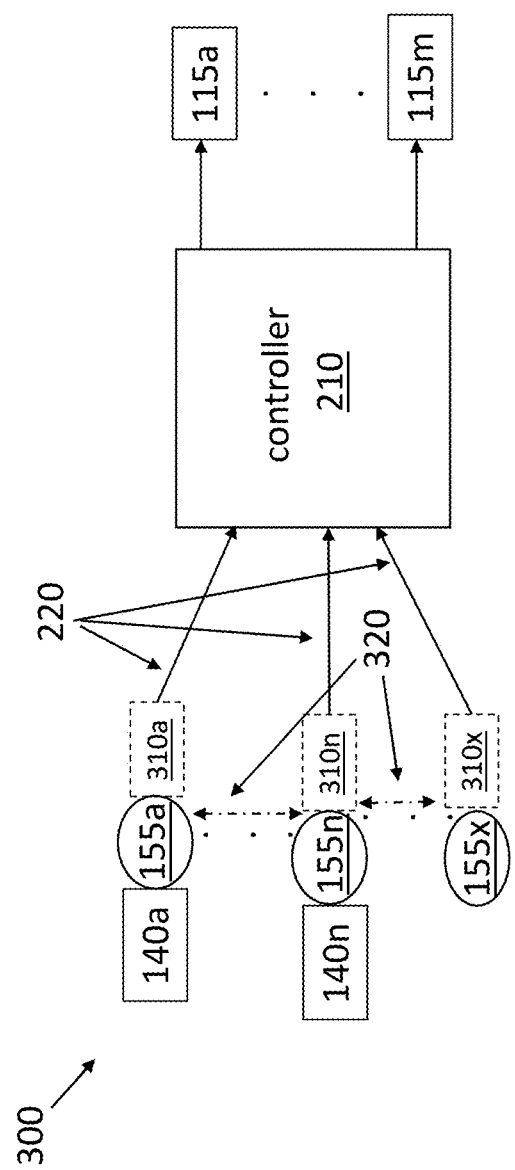
FIG. 3 is a block diagram of another exemplary dynamic sensor network according to one or more embodiments.

FIG. 3 is a block diagram of an exemplary dynamic sensor network 300 according to one or more embodiments. FIG. 3 shows additional or alternate features as compared with the exemplary dynamic sensor network 200 shown in FIG. 2. The fundamental components of the controller 210 and communication lines 220 from various ports 155 to which sensors 140 may couple is shown. As shown in FIG. 3, each port 155 may include an optional microcontroller 310a through 310x (generally referred to as 310). Thus, data from each sensor 140 that is coupled to a port 155 may be routed through a microcontroller 310 via a communication line 220 to the controller 210.

Additionally or alternately, redundant wired or wireless communication lines 320 may be included between ports or, more specifically, between microcontrollers 310. That is, sensors 140 may communicate data from a corresponding port 155 to another port 155 for relay to the controller 210 via a communication line 220 from the other port 155. This may be necessitated due to failure of the communication line 220 from the port 155 corresponding with the sensor 140, for example. Alternately, microcontrollers 310 may communicate data obtained from a corresponding sensor 140 to another microcontroller 310. The data may be relayed to the controller 210 or may be combined with data from the sensor 140 corresponding to the other microcontroller 310 prior to being provided to the controller 210, for example.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system in an atmospheric suit, the system comprising:
    a controller within the atmospheric suit:
    a first network configured as a first hub and spoke network arranged within the atmospheric suit, wherein the controller is the hub of the first network, each spoke of the first network represents first wiring that leads to one of a plurality of ports accessible from outside the atmospheric suit;
    a battery; and
    a second network configured as a second hub and spoke network arranged within the atmospheric suit, wherein the battery is the hub of the second network, each spoke of the second network represents second wiring that leads to one of the plurality of ports accessible from outside the atmospheric suit.

2. The system according to claim 1, wherein the controller is configured to obtain data from one or more sensors coupled to one or more of the plurality of ports via the first network, and wherein the battery is configured to facilitate charging of the one or more sensors via the second network.

3. The system according to claim 2, wherein the one or more sensors includes a camera, a proximity sensor, a range finder, or a Geiger counter and the controller is configured to process the data from the one or more sensors to obtain information.

4. The system according to claim 3, wherein a wearer of the atmospheric suit specifies processing of the data.

5. The system according to claim 3, wherein the controller is configured to provide information based on the data to a wearer of the atmospheric suit as output to one or more output devices.

6. The system according to claim 5, wherein the one or more output devices include audio, video, or haptic output devices.

7. The system according to claim 5, wherein one of the one or more sensors is a camera, one of the one or more output devices is a display device, and the controller is configured to obtain images from the camera and provide the information based on the images for display to the wearer on the display device.

8. The system according to claim 1, further comprising microcontrollers corresponding with one or more of the plurality of ports.

9. The system according to claim 8, wherein the first network includes redundant communication between two or more of the plurality of microcontroller or between two or more of the ports.

10. The system according to claim 1, further comprising a cover on each of the plurality of ports.

11. A method of assembling a system in an atmospheric suit, the method comprising:
    configuring a controller within the atmospheric suit;
    arranging a first network configured as a first hub and spoke network within the atmospheric suit, wherein the controller is the hub of the first network, each spoke of the first network represents first wiring that leads to one of a plurality of ports accessible from outside the atmospheric suit; and arranging a second network configured as a second hub and spoke network within the atmospheric suit, wherein a battery is the hub of the second network, each spoke of the second network represents second wiring that leads to one of the plurality of ports accessible from outside the atmospheric suit.

12. The method according to claim 11, wherein the configuring the controller includes the controller obtaining data from one or more sensors coupled to one or more of the plurality of ports via the first network, and wherein the battery is configured to facilitate charging of the one or more sensors via the second network.

13. The method according to claim 12, wherein the one or more sensors includes a camera, a proximity sensor, a range finder, or a Geiger counter and the configuring the controller includes the controller processing the data from the one or more sensors to obtain information.

14. The method according to claim 13, wherein the configuring the controller includes the controller obtaining an indication of the processing of the data from a wearer of the atmospheric suit.

15. The method according to claim 13, wherein the configuring the controller includes the controller providing information based on the data to a wearer of the atmospheric suit as output to one or more output devices.

16. The method according to claim 15, wherein the one or more output devices include audio, video, or haptic output devices.

17. The method according to claim 15, wherein one of the one or more sensors is a camera, one of the one or more output devices is a display device, and the configuring the controller includes the controller obtaining images from the camera and providing the information based on the images for display to the wearer on the display device.

18. The method according to claim 11, wherein the arranging the first network includes disposing microcontrollers corresponding with one or more of the plurality of ports.

19. The method according to claim 18, wherein the arranging the first network includes configuring redundant communication between two or more of the microcontrollers or between two or more of the ports.

20. The method according to claim 11, further comprising disposing a cover on each of the plurality of ports.

* * * * *